United States Patent [19]

Hoeschele

[11] B 4,013,624

[45] Mar. 22, 1977

[54] BRANCHED THERMOPLASTIC COPOLYESTERS

[75] Inventor: Guenther Kurt Hoeschele, Wilmington, Del.

[73] Assignee: E. I. Du Pont de Nemours and Company, Wilmington, Del.

[22] Filed: Mar. 20, 1972

[21] Appl. No.: 236,266

[44] Published under the second Trial Voluntary Protest Program on March 23, 1976 as document No. B 236,266.

[52] U.S. Cl. .......................... 260/75 R; 260/75 M; 260/75 S; 260/860
[51] Int. Cl.² ......................................... C08G 63/20
[58] Field of Search ...................... 260/75 R, 75 M

[56] References Cited

UNITED STATES PATENTS

| | | | |
|---|---|---|---|
| 2,895,946 | 7/1959 | Huffman | 260/75 |
| 3,546,180 | 12/1970 | Caldwell et al. | 260/76 |

*Primary Examiner*—Donald E. Czaja
*Assistant Examiner*—W. C. Danison, Jr.

[57] ABSTRACT

A segmented, branched thermoplastic copolyester containing intralinear long chain and short chain ester units is produced at a high rate if such production takes place in the presence of a critical amount of a branching agent, said branching agent having the general formula $(HO)_a X (COOH)_b$ and having a molecular weight of about 92 to 5000, wherein X is a polyfunctional radical, $a = 0-6$, $b = 0-4$ and $a + b = 3-6$.

16 Claims, No Drawings

BRANCHED THERMOPLASTIC COPOLYESTERS

BACKGROUND OF THE INVENTION

This invention relates to branched thermoplastic copolyesters and more particularly to copolyesters wherein the branching is effected by the presence of a branching agent during the preparation of said copolyester. The branching agent serves to lessen substantially the time needed to produce a copolyester of acceptable melt viscosity; that is to say, the presence of branching within the copolyester serves to lessen the reaction time which is necessary to produce a copolyester of desired viscosity. The branching agent must be present in a critical amount which will subsequently be defined.

Linear thermoplastic copolyesters have been suggested heretofore for various purposes, particularly for the production of films and fibers. Recently, certain polymers of this type have been found suitable for particular application such as, for example, molded vehicle tires where superior tear strength, tensile strength, flex life and abrasion resistance are necessary. The copolyesters, which have these desirable features, require a rather extended period of reaction time to reach a suitable melt index, for extrusion, injection molding and blow molding applications e.g. about 10-1 at 220°C. Consequently, a method for producing the copolyester which will minimize the time required to reach the desired viscosity is needed in order to minimize the investment in polymerization equipment or conversely to increase the output of a given set of equipment.

According to this invention there is provided a method for producing such a branched thermoplastic copolyester, which minimizes the time required for producing the copolyester having a desired melt index. (e.g. 10 to 1). The copolyster possesses all of its original desired properties such as superior tear strength, tensile strength, flex life etc. and has improved high temperature properties relative to the unbranched copolyester. In addition, the good processibility of the copolyester is retained and can even be improved for use in extrusion and blow molding. For certain copolyesters the present method permits the preparation of polymers having superior properties relative to the corresponding unbranched polymer.

The above described improvement is effected by preparing the copolyester in the presence of a critical amount of a branching agent, said branching agent having the general formula $(HO)_a \, X \, (COOH)_b$, wherein X is a polyfunctional radical, $a = 0-6$, $b = 0-4$ and $a + b = 3-6$.

The copolyester which is prepared in the presence of the branching agent of the instant invention is a thermoplastic copolyester consisting essentially of a multiplicity of recurring intralinear long chain and short chain ester units connected head-to-tail through ester linkages, said long chain ester units being represented by the following structure:

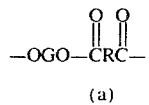

(a)

and said short chain ester units being represented by the following structure:

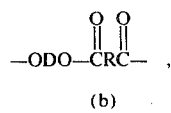

(b)

wherein:
G is a divalent radical remaining after removal of terminal hydroxyl groups from poly(alkylene oxide) glycols having a carbon-to-oxygen ratio of about 2.0–4.3 and a molecular weight between about 400 and 4,000;
R is a divalent radical remaining after removal of carboxyl groups from a dicarboxylic acid having a molecular weight less than about 300; and
D is a divalent radical remaining after removal of hydroxyl groups from a low molecular weight diol having a molecular weight less than about 250.

It is preferred that the short chain ester units constitute about 15–95% by weight of the copolyester and at least about 50% of the short chain ester units be identical.

The segmented thermoplastic copolyetherester described above is prepared by reacting at elevated temperature and by conventional means: a dicarboxylic acid having a weight less than about 300 or its corresponding ester equivalent, which would be represented by the formula

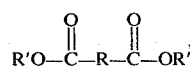

wherein R is a divalent radical and R' is independently selected from the group consisting of hydrogen and $C_1$–$C_{10}$ alkyl; a poly(alkylene oxide) glycol having a molecular weight of about 400-4000 and a carbon to oxygen ratio of about 2.0–4.3 which would be represented by the formula HO—G—OH wherein G is a divalent radical and a diol having a molecular weight less than about 250 which would be represented by the formula HO—D—OH wherein D is a divalent radical.

The reaction between the dicarboxylic acid, the poly(alkylene oxide) glycol and the diol is conducted in the presence of a branching agent. The branching agent has the general formula $(HO)_a \, X \, (COOH)_b$ and has a molecular weight of about 92 to 5000. X is a polyfunctional radical, $a = 0$ to 6, $b = 0$–4 and the sum of $a + b = 3$ to 6. It is critical to the instant invention that the branching agent be present in the amount of about 0.3 to 1.2 equivalents per 100 moles of dicarboxylic acid. When the branching agent is present in amounts of less than 0.3 equivalent, the increase in output of copolyester having the desired melt viscosity is insignificant. At concentrations above 1.2 equivalents certain properties such as tensile strength and flex resistance of the finished copolyester are affected adversely.

In an embodiment of the instant invention the diol and the dicarboxylic acid may be reacted independently initially and then the product of the reaction reacted in turn with the glycol. The branching agent may be added to either stage when this procedure is used.

DETAILED DESCRIPTION

The term "long chain ester units" as applied to units in a polymer chain refers to the reaction product of a long chain glycol with a dicarboxylic acid. Such "long chain ester units," which are a repeating unit in the copolyetheresters of this invention, correspond to formula (a) above. The long chain glycols are polymeric glycols having terminal (or as nearly terminal as possible) hydroxyl groups and a molecular weight from about 400–4,000. The long chain glycols used to prepare the copolyetheresters of this invention are poly-(alkylene oxide) glycols having a carbon-to-oxygen ratio of about 2.0–4.3. Representative long chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3). The carbon to oxygen ratio of about 2.0–4.3 is meant to include lower molecular weight glycols in which the carbon to oxygen ratio is 1.8 since the 2.0 to 4.3 ratio does not take into account the elements of water, which are present in the glycol in addition to the alkylene oxide units, but are split out and are not part of the polymer.

The term "short chain ester units" as applied to units in a polymer chain refers to low molecular weight polymer chain units having molecular weights less than about 550. They are made by reacting a low molecular weight diol (below about 250) with a dicarboxylic acid to form ester units represented by formula (b) above.

Included among the low molecular weight diols which react to form short chain ester units are acyclic and alicyclic dihydroxy compounds. Preferred are diols with 2–15 carbon atoms such as ethylene, propylene, tetramethylene, pentamethylene, 2,2-dimethyl-trimethylene, hexamethylene, and decamethylene glycols, dihydroxy cyclohexane, cyclohexane dimethanol, etc. Especially preferred are aliphatic diols containing 2–8 carbon atoms. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives as diacetates; provided, however, that the molecular weight requirement pertains to the diol only and not to its derivatives.

Dicarboxylic acids which are reacted with the foregoing long chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, inlcudes equivalents of dicarboxylic acids having two functional carboxyl groups which perform substantially like dicarboxylic acids in reaction with glycols and diols in forming copolyester polymers. These equivalents include esters and ester-forming derivatives, such as acid anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis(cyclohexane carboxylic acid), 3,4-furan dicarboxylic acid, and 1,1-cyclobutane dicarboxylic acid. Preferred aliphatic acids are cyclohexane dicarboxylic acids and adipic acid.

Representative aromatic dicarboxylic acids which can be used include terephthalic, phthalic and isophthalic acids, bibenzoic acid, substituted dicarboxy compounds with two benzene nuclei such as bis(p-carboxyphenyl)methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are a preferred class for preparing the copolyester polymers of this invention. Among the aromatic acids, those with 8–16 carbon atoms are preferred, particularly the phenylene dicarboxylic acids, i.e., terephthalic, phthalic and isophthalic acids. As mentioned previously the esters of the phenylene dicarboxylic acids and in particular their dimethyl esters are included within the scope of the term dicarboxylic acid.

It is much preferred that at least about 50% of the short segments are identical and that the identical segments form a homopolymer in the fiber-forming molecular weight range (molecular weight > 5,000) having a melting point of at least 150°C. and preferably greater than 200°C. Polymers meeting these requirements exhibit a useful level of properties such as tensile strength and tear strength. Polymer melting points are conveniently determined by differential scanning calorimetry.

The short chain ester units will constitute about 15–95 weight percent of the copolyester. The remainder of the copolyester will be the long segments and thus the long segment will comprise about 5–85 weight percent of the copolyester.

The branching agents to be utilized in the instant invention must be present in the reaction medium in the critical range of 0.3 to 1.2 equivalents per 100 moles of the dicarboxylic acid which are utilized. The branching agent has the general formula $(HO)_a$ X $(COOH)_b$ and must have a molecular weight of about 92 to 5000. X is a polyfunctional radical and $a = 0–6$, $b = 0–4$ and the sum of $a + b$ must be 3–6. In more detail, the branching agent may be a polyol having 3 to 6 hydroxyl groups, a polycarboxylic acid having 3 or 4 carboxyl groups or a hydroxy acid having a total of 3–6 hydroxyl and carboxyl groups.

Representative polyols which can be used include glycerol, trimethylolpropane, pentaerythritol, 1,2,6-hexanetriol, sorbitol, 1,1,4,4-tetrakishydroxymethyl cyclohexane, tris(2-hydroxyethyl) isocyanurate, and dipentaerythritol. In addition to these low molecular weight polyols, higher molecular weight polyols, particularly triols, derived by condensing alkylene oxides having 2–3 carbons e.g. ethylene oxide and propylene oxide with polyol initiators e.g. glycerol which have 3–6 carbons can also be used as branching agents.

Representative polycarboxylic acids which may be use include hemimellitic acid, trimellitic acid, trimesic acid, pyromellitic acid, 1,1,2,2-ethanetetracarboxylic acid, 1,1,2-ethanetricarboxylic acid, 1,3,5-pentanetricarboxylic acid and 1,2,3,4-cyclopentanetetracarboxylic acid. The acids may be used as such but preferably in the form of their lower alkyl esters.

Representative hydroxy acids include malic acid, citric acid, tartaric acid, 3-hydroxyglutaric acid, mucic acid, trihydroxyglutaric acid and 4-β-hydroxyethyl phthalic acid.

The branching agent is of course intended to include substituted polyols, polycarboxylic acids, and hydroxy acids providing that the substituted compounds will not disturb the preparation of the copolyesters.

In preferred embodiments of the instant invention $a$ is 3 or 4 and $b$ is zero or $b$ is 3 or 4 and $a$ is zero. Individual agents which are preferred include glycerol, 1,1,1-trimethylol propane, tris(2-hydroxyethyl) isocyanurate, pentaerythritol, poly(ethylene oxide) and poly(propylene oxide) triols of about 400–3,000 molecular weight, trimellitic acid and pyromellitic acid. Glycerol and 1,1,1-trimethylolpropane are especially preferred.

A preferred class of copolyesters which are prepared by the process of this invention are those prepared from dimethyl terephthalate, 1,4-butanediol, and poly(tetramethylene oxide) glycol having a molecular weight of about 600–2,000 or poly (ethylene oxide) glycol having a molecular weight of about 600–1,500. Optionally, up to about 30 mole per cent and preferably 5–25 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1,600. Up to 30 mole percent and preferably 10–25 mole percent of the dimethyl terephthalate can be replaced with dimethyl isophthalate or butanediol can be replaced with neopentyl glycol until up to about 30 percent and preferably 10–25 percent of the short chain ester units are derived from neopentyl glycol in these poly(propylene oxide) glycol polymers. The polymers based on poly(tetramethylene oxide) glycol are especially preferred because they are easily prepared, have overall superior physical properties, and are especially resistant to water.

The present method permits the preparation of copolyesters based on poly(1,2-propylene oxide) glycol which have a higher degree of polymerization (as indicated by inherent viscosity and melt index) than that obtainable by conventional melt condensation polymerization. The higher molecular weight branched copolyesters exhibit significant improvements in physical properties such as tensile strength, tear strength, flex life and creep resistance. As mentioned previously, the branching agents must be added to the reaction mixture in the amount of 0.3 to 1.2 equivalents per 100 moles of dicarboxylic acid.

The dicarboxylic acids or their derivatives, the polymeric glycol and the branching agent are incorporated into the final copolyester in the same proportions as are present in the reaction mixture. The equivalents of low molecular weight diol actually incorporated corresponds to the difference between the sum of the equivalents of carboxyl groups provided by the diacid and the branching agent (if it contains carboxyl groups) and the sum of the equivalents of hydroxyl groups provided by the polymeric glycol and the branching agent (if it contains hydroxyl groups) present in the reaction mixture. When mixtures of low molecular weight diols are employed, the amounts of each diol incorporated is largely a function of the amounts of the diols present, their boiling points, and relative reactivities.

A preferred procedure for preparing the copolyester involves heating the dicarboxylic acid e.g. the dimethyl ester of terephthalic acid, with a long chain glycol e.g. poly(tetramethylene oxide) glycol and diol, e.g. 1,4-butanediol in the presence of a catalyst at about 150°–260°C. and a pressure of 0.5 to 5 atmospheres, preferably ambient pressure, while distilling off methanol formed by this ester interchange. Depending on temperature, catalyst, glycol excess, and equipment, this reaction can be completed within a few minutes e.g. 2 minutes to a few hours e.g. 2 hours. The branching agent preferably is introduced into the copolyester by adding it at the ester interchange stage along with the diester, long chain glycol and diol. When direct esterification of a dicarboxylic acid with the long chain glycol and diol is used as a preparative procedure, the branching agent is preferably added to the esterification along with the other reactants. The branching agent may be added as a separate stream or in solution in one of the other reactants.

Concerning the molar ratio of reactants, other than the branching agent, at least about 1.1 mole of diol should be present for each mole of acid, preferably at least about 1.25 mole of diol for each mol of acid. The long chain glycol should be present in the amount of about 0.0025 to 0.85 mole per mole of dicarboxylic acid, preferably 0.01 to 0.6 mole per mole of acid.

This procedure results in the preparation of a low molecular weight prepolymer which can be carried to the high molecular weight copolyester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst and branching agent until randomization occurs.

The short chain ester homopolymer or copolymer can be prepared by ester interchange from either the dimethyl esters and low molecular weight diols, as above, or from the free acids with the diol acetates. As indicated before, the branching agent is preferably introduced into the process at the earliest convenient stage of preparation, e.g. the ester interchange.

Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. This process is known as "polycondensation."

Additional ester interchange occurs during this polycondensation which serves to increase the molecular weight and to randomize the arrangement of the copolyester units. The branching agent can also be introduced during the early stages of the polycondensation. With lower boiling branching agents, some of the branching agent can distill from the polycondensation mass before it reacts. It is preferred to add the branching agent at earlier stages of the process to avoid this complication and to provide the maximum opportunity for the branching agent to be distributed randomly throughout the polymer. Best results are usually obtained if this final distillation or polycondensation is run at less than about 5mm. Hg pressure and about 200°–270°C for less than about two hours e.g. 0.5 to 1.5 hours.

Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be employed, organic titanates such as tetrabutyl titanate used along or in combination with magnesium or calcium acetates are preferred. Complex titanates, such as $Mg[HTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The catalyst should be present in the amount of 0.005 to 0.2% by weight based on total reactants.

Ester interchange polymerizations are generally run in the melt without added solvent, but inert solvents can be used to facilitate removal of volatile components from the mass at low temperatures. This technique is especially valuable during prepolymer preparation, for example, by direct esterification. Both batch and continuous methods can be used for any stage of copolyester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The incorporation of the branching agent in the copolyetherester in amounts of 0.3 to 1.2 equivalents per 100 moles of dicarboxylic acid significantly increases the melt viscosity (decreases melt index) for a given degree of polymerization as indicated by inherent viscosity. As a result, polymers having suitable melt indices for processing as thermoplastics can be produced with significantly shorter reaction cycles. The polyesters containing the branching agent retain the valuable properties exhibited by their linear (or unbranched) counterparts and have improved high temperature stress-strain properties. As indicated before it is possible to significantly improve the physical properties of poly(propylene oxide) glycol based copolyester by the present process. As mentioned previously, below the lower limit of 0.3 equivalents of branching agent per 100 moles of dicarboxylic acid, the decrease in the time required for polymerization is not significantly reduced. Above 1.2 equivalents of branching agent, certain physical properties of the copolyester are seriously affected. In particular, tensile strength, elongation at break, flex resistance and moduli at low elongations (below 10%) are diminished.

Various antioxidants may also be added to the copolyester. They include amine stabilizers such as sym-di-betanaphthyl-p-phenylene diamine, N,N'-bis(1-methylheptyl)-p-phenylene diamine and 4,4'-bis($\alpha,\alpha$-dimethylbenzyl) diphenylamine and hindered phenolic stabilizers such as 1,3,5-trimethyl-2,4,6-tris[3,5-di-tert.-butyl-4-hydroxybenzyl]benzene and 1,3,5-tris(3,5-di-tert.-butyl-4-hydroxyhydrocinnamoyl)hexahydro-S-triazine. For protection against ultraviolet light UV absorbers such as substituted benzophenones and benzotriazoles can be added.

The properties of the copolyesters can also be modified by incorporation of various conventional inorganic fillers such as carbon black, silica gel, alumina, clays and chopped fiberglass. In general, these additives have the effect of increasing the modulus of the material at various elongations. Compounds having a range of hardness values can be obrained by blending hard and soft copolyesters of this invention.

All parts, proportions and percentages disclosed herein are by weight unless otherwise indicated.

The following examples further illustrate the invention:

EXAMPLES

The following ASTM methods are employed in determining the properties of the polymers prepared in the examples which follow:

| | |
|---|---|
| Modulus at 100% elongation | D412* |
| Modulus at 300% elongation | D412* |
| Modulus at 500% elongation | D412* |
| Tensile at Break | D412* |
| Elongation at Break | D412* |
| Hardness, Shore D | D1484 |
| Trouser Tear | D470** |
| Melt index | D1238*** |
| Ross flex | D1052 |
| Heat aging | D573 |

*cross-head 20" per minute
**Modified by use of 1.5" × 3" sample with 1.5" cut on the long axis of the sample. This configuration prevents "necking down" at the point of tearing.
***2160 g. load The following catalyst is used in preparing the compositions of the examples:

Catalyst

An agitated flask equipped for reflux is charged with 400 ml of methanol alcohol, 22.3 gm of anhydrous magnesium acetate, 88.8 ml of tetrabutyl titanate and 300 ml of 1,4-butanediol. Agitation is started and the mixture is refluxed at 65°C. for about one-half hour until complete solution of solids occurs.

EXAMPLE 1

A. The following materials are placed in a flask fitted for distillation:

| | |
|---|---|
| Poly(tetramethylene oxide) glycol, number average molecular weight 974 | 385 pts. |
| Dimethyl terephthalate | 600 pts. |
| 1,4-butanediol | 365 pts. |
| Glycerol | 0.71 pts. |
| Sym-di-beta-naphthyl-phenylene diamine | 2.98 pts. |
| Catalyst | 7.1 pts. |

A stainless steel stirrer with a paddle cut to conform with the internal radius of the flask is positioned about one-eighth inch from the bottom of the flask and agitation is started. The flask is placed in an oil bath at 160°C., agitated for 5 minutes and then the catalyst is added. Methanol distills from the reaction mixture as the temperature is slowly raised to 250°C. over a period of 70 minutes. When the temperature reaches 250°C. the pressure is gradually reduced to 0.35 mm Hg. within 30 minutes. The polymerization mass is agitated at 250°C./0.25 mm Hg. for a specified period of time as shown below, e.g. 50 minutes. Then the polycondensation polymerization is discontinued and the resulting viscous molten product is scraped from the flask in a nitrogen (water and oxygen free) atmosphere and allowed to cool.

The polymer which has a calculated branching agent content of 0.75 equivalents per 100 moles of dicarboxylic acid is characterized by measuring the inherent viscosity at a concentration of 0.1g/dl in m-cresol at 30°C. and the melt index determined at 220°C. The pertinent data are tabulated below.

B. The procedure described above is substantially repeated except that 0.994 parts of glycerol is used instead of 0.71 part. The polymer has a calculated branching agent content of 1.05 equivalents per 100 per moles of dicarboxylic acid.

For control purposes the above preparation of the copolyester is substantially repeated except that control polymers No. 1 and No. 2 contain no branching agent whereas control polymer No. 3 has a branching agent (glycerol) content of 1.35 equivalents per 100 moles of dicarboxylic acid which is outside of critical range of this invention.

The results of these five polymerization experiments are tabulated below:

| Polymer Composition | Branching Agent Concentration (equiv/ 100 mole dicarboxylic acid) | Length of Poly-condensation cycle (min.) | Inherent Viscosity dl/g | Melt Index g/10 min. |
|---|---|---|---|---|
| Ex. 1A | 0.75 | 48 | 1.60 | 3.77 |
| Ex. 1B | 1.05 | 40 | 1.40 | 5.2 |
| Control 1 | none | 50 | 1.18 | 19.8 |
| Control 2 | none | 95 | 1.70 | 4.10 |
| Control 3 | 1.35 | 35 | 1.55 | 2.36 |

It is evident from these results that in the presence of a branching agent in a critical minimum amount shorter polycondensation times are required to obtain high melt viscosity polymers as indicated by the melt index. Since the inherent viscosity/melt index relationship is affected by the degree of branching the inherent viscosity data do not reflect the differences in the degree of polymerization to the same extent.

The physical properties of the polymer compositions of this example and control polymers 2 and 3 were determined on 80 mil slabs which were compression molded at 240°C. The pertinent data are tabulated below.

| Room temperature properties | Example 1A | Example 1B | Control 2 | Control 3 |
|---|---|---|---|---|
| Tensile strength, psi | 5700 | 4200 | 5900 | 3000 |
| Elongation at break,% | 740 | 650 | 730 | 440 |
| 100% modulus, psi | 2100 | 2100 | 2100 | 2050 |
| 300% modulus, psi | 2380 | 2290 | 2360 | 2300 |
| 500% modulus, psi | 2350 | 3100 | 3620 | — |
| Trouser tear, pli | 440 | 385 | 400 | 470 |
| Hardness Durometer D | 56 | 57 | 56 | 54 |
| Ross Flexlife, pierced,10⁶ cycles to 500% cut growth | >1.5 | 1.0 | >1.5 | 0.5 |
| Properties at 150°C. | | | | |
| Tensile strength, psi | >2040 | >1780 | >1890 | >2430 |
| Elongation at break,% | >570 | >510 | >550 | >600 |

| Room temperature properties | Example 1A | Example 1B | Control 2 | Control 3 |
|---|---|---|---|---|
| 100% modulus, psi | 600 | 685 | 530 | 790 |
| 300% modulus, psi | 940 | 1090 | 870 | 1125 |
| 500% modulus, psi | 1650 | 1745 | 1630 | 1845 |

Polymers 1A and 1B largely retain the valuable properties exhibited by unbranched Control Polymer 2. Polymers 1A and 1B also show improved high temperature modulus relative to Control Polymer 2. Control Polymer 3 which contains the branching agent in an amount outside the limits of this invention is deficient in tensile strength and flex life.

EXAMPLE 2

A. Example 1B was essentially repeated except that 1.45 parts of 1,1,1-trimethylol propane was used instead of 0.994 parts of glycerol.

B. Example 2A was essentially repeated except that the 1,1,1-trimethylol propane was substituted by 2.3 parts of tris(2-hydroxyethyl) isocyanurate.

C. Example 2A is essentially repeated except that the 1,1,1-trimethylol propane is substituted for 2.72 parts of trimethyl trimellitate.

Polymer compositions 2A and 2B and 2C have the same branching agent concentration as Polymer 1B, namely 1.05 equivalents per 100 moles of dicarboxylic acid.

The branching agents of this example increase the rate of polycondensation polymerization in substantially the same manner as shown for Example 1B. The resulting polymers exhibit essentially the same improved high temperature properties as shown for copolyester 1B.

EXAMPLE 3

A copolyester was prepared according to the procedure of Example 1 from the following starting materials:

| | |
|---|---|
| Poly(1,2-propylene oxide) glycol, number average molecular weight 1000 | 380 pts. |
| Dimethyl terephthalate | 657 pts. |
| 1,4-butane diol | 380 pts. |
| Glycerol based poly(1,2-propylene oxide) triol, number average molecular weight 1000 | 4.9 pts. |
| Sym-di-beta-naphthyl-phenylene diamine | 3.25 pts. |
| Catalyst | 7.5 pts. |

The polycondensation reaction is carried out by agitating the polymerization mass at 250°C/0.1 mm Hg. for 75 minutes. The resulting polymer has a calculated branching agent content of 0.45 equivalent per 100 moles of dicarboxylic acid, an inherent viscosity of 1.32 dl/g and a melt index of 1.68 g/10 min. measured at 220°C.

For control purposes the preparation of the copolyester of this example is substantially repeated except that no branching agent was used. Regardless of the length of polycondensation cycle the resulting polymer has a maximum inherent viscosity of 1.19 dl/g and a melt index of 5.5g/10 min. measured at 220°C.

The physical properties measured on compression molded 80 mil slabs are tabulated below:

| Room temperature properties | Polymer of Example 3 | Control Polymer |
|---|---|---|
| Tensile strength, psi | 4000 | 3350 |
| Elongation at break, % | 570 | 520 |
| $M_{100}$, psi | 2050 | 2030 |
| $M_{300}$, psi | 2480 | 2480 |
| $M_{500}$, psi | 3500 | 3450 |
| Trouser tear, pli | 250 | 200 |
| Shore D hardness | 53 | 53 |
| Tensile strength, psi | 2140 | 1740 |
| Elongation at break, % | 620 | 630 |
| Modulus 100%, psi | 730 | 685 |
| Modulus 300%, psi. | 1035 | 870 |
| Modulus 500%, psi | 1645 | 1550 |

The higher degree of polymerization achieved by the modification with a branching agent results in higher tensile and tear strength as well as improved high temperature properties. Other physical properties such as flex life and creep resistance are also substantially improved.

What is claimed is:

1. In a process for preparing a segmented thermoplastic copolyester, said copolyester consisting essentially of a multiplicity of recurring long chain ester units and short chain ester units joined head-to-tail through ester linkages, said long chain ester units being represented by the formula I 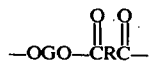

and said short chain units being represented by the formula

II 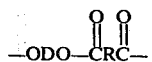

which comprises reacting a dicarboxylic acid having a weight less than about 300; said acid being represented by the formula

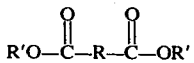

wherein R is a divalent radical and R' is independently selected from the group consisting of hydrogen and $C_1$–$C_{10}$ alkyl; a poly(alkylene oxide) glycol having a molecular weight of about 400–4,000 and a carbon to oxygen ratio of about 2.0–4.3 said glycol being represented by the formula

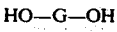

wherein G is a divalent radical, and a diol having a molecular weight less than about 250 and represented by the formula

HO—D—OH wherein D is a divalent radical, the improvement which comprises conducting the reaction in the presence of about 0.3 to 1.2 equivalents per 100 moles of said dicarboxylic acid of a branching agent, said branching agent being represented by the formula $(HO)_a X (COOH)_b$, wherein X is a polyfunctional radical, $a = 0-6$, $b = 0-4$ and $a + b = 3-6$, said branching agent having a molecular weight of about 92 to 5,000.

2. The process of claim 1 wherein said branching agent is selected from the group consisting of polyols having 3 to 6 hydroxyl groups, polycarboxylic acids having 3 to 4 carboxyl groups or hydroxy acids having a total of 3 to 6 hydroxyl and carboxyl groups.

3. The process of claim 1 wherein $a$ is 0 and $b$ is 3 or 4, or $b$ is 0 and $a$ is 3 or 4.

4. The process of claim 1 wherein said branching agent is selected from the groups consisting of glycerol, 1,1,1-trimethylol propane, tris(2-hydroxyethyl) isocyanurate pentaerythritol, trimellitic acid, pyromellitic acid and poly (ethylene oxide) and poly(propylene oxide) triols of about 400–3,000 molecular weight.

5. The process of claim 1 wherein said branching agent is glycerol.

6. The process of claim 1 wherein the dicarboxylic acid is an aromatic dicarboxylic acid.

7. The process of claim 1 wherein said dicarboxylic acid is selected from the group consisting of phthalic acid, terephthalic acid, isophthalic acid, their dimethyl esters and mixtures thereof.

8. The process of claim 1 wherein the poly(alkylene oxide) glycol is poly(tetramethylene oxide) glycol having a molecular weight of about 600–2,000.

9. The process of claim 1 wherein said glycol is poly(propylene oxide) glycol.

10. The process of claim 1 wherein at least 50 percent of said short units are identical.

11. The process of claim 10 wherein said short segments constitute about 15–95 weight percent of the copolyester.

12. The process of claim 1 wherein said dicarboxylic acid is a mixture of dimethyl terephthalate and a maximum of 30 mole per cent of dimethyl isophthalate, dimethyl phthalate or mixtures thereof.

13. The product of claim 1.
14. The product of claim 2.
15. The product of claim 4.
16. The product of claim 11.

* * * * *